United States Patent [19]

Wan et al.

[11] Patent Number: 5,038,204
[45] Date of Patent: Aug. 6, 1991

[54] MULTI-LEVEL ANALOG COMPOSITE VIDEO SIGNAL GENERATING APPARATUS

[75] Inventors: Gary Wan, Waldwick; Richard B. Huykman, Montville, both of N.J.

[73] Assignee: Allied-Signal Inc., Morris Township, Morris County, N.J.

[21] Appl. No.: 523,460

[22] Filed: May 15, 1990

[51] Int. Cl.$^5$ .......................... H04N 9/64; H04N 9/73
[52] U.S. Cl. ..................................... 358/21 R; 358/29
[58] Field of Search .................. 358/29, 27, 21 R, 30, 358/40, 75, 76, 80; 340/701, 704

[56] References Cited

U.S. PATENT DOCUMENTS 4,994,901  2/1991  Parulski ........................... 358/21 R Primary Examiner—Tommy P. Chin
Attorney, Agent, or Firm—Howard G. Massung; Robert A. Walsh

[57] ABSTRACT

Apparatus responsive to digital video data features a video amplitude digital to analog converter for controlling the full scale outputs of other digital to analog converters for generating multi-level analog composite video signals. The digital to analog converter outputs are controlled and fine tuned to meet particular requirements. The implementation is based on a consistent ratio between the white, sync and black video levels of the composite signals, irrespective of the differences between the required white video levels.

13 Claims, 2 Drawing Sheets

MULTI-LEVEL ANALOG COMPOSITE VIDEO SIGNAL GENERATING APPARATUS

BACKGROUND OF THE INVENTION

This invention relates to apparatus for generating analog composite video signals and, more particularly, to apparatus for generating a wide range of said signals.

Analog composite video signals have several amplitude levels, i.e.: a white (maximum video) level; a black (minimum video) level; a blank level; and a sync level. When generating analog composite video signals, a problem is encountered in that different video displays have different level requirements, often having close amplitude tolerance specifications. For example, one monitor arrangement accepts a compatible composite video signal requiring particular white and sync levels whereas another compatible monitor arrangement requires other white and sync levels. Non-standard monitors require a still different set of signal levels. In some cases, the signal levels can be three to five times higher than ordinary standards. Accordingly, video signal generation must be accomplished so as to provide different signal levels with sufficient resolution to meet particular requirements.

Conventionally, digital video data are converted to analog composite video signals by using high speed video digital to analog converters to produce the required signal levels. Different signal levels require the use of ultra-high resolution converters. In this regard, it will be understood that the converters are used to control the highest video white level in order to have acceptable resolution capability at lower levels. This "brute force" approach places the burden on component manufacturers to provide precision, high speed, high resolution video digital to analog converters to meet the resolution requirements of both high and low white level video signals. This approach is disadvantageous because the availability of the required digital to analog converters is limited and their cost is prohibitively expensive. Further, digital to analog converters of the type described are difficult to use because their noise sensitivity increases with their resolution, requiring careful circuit design resulting in increased effort and cost.

The present invention reduces the number of high speed digital to analog converters from that otherwise necessary and eliminates the need for ultra-high resolution converters, while maintaining the highest possible full scale digital to analog converter resolution for all white video levels. This arrangement, based on a substantially consistent ratio between the white, sync and black signal levels, results in both component and labor cost savings without compromising the ultimate result.

SUMMARY OF THE INVENTION

This invention contemplates multi-level analog composite video signal generating apparatus wherein a video palette includes digital to analog converters for providing outputs which are used to generate analog composite red, composite blue and composite green video signals for application to a cathode ray tube for providing a color raster display. A video amplitude digital to analog converter provides full scale reference control to the video palette digital to analog converters. Sync, blank and offset digital to analog converters are referenced by a voltage derived and scaled from a common source. Specified video signal parameters corresponding to sync, blank and offset are loaded into the video palette in accordance with an automatic scaling relationship by changing the parameter of the video amplitude digital to analog converter. Full scale outputs of the sync, blank and offset digital to analog converters are proportionately controlled. The outputs of said digital to analog converters are summed with the outputs of the video palette digital to analog converters to provide the analog composite red, green and blue video signals.

An implementation of the type described results in simplified multi-level analog composite video signal generation. The amplitudes of each of the converter outputs, i.e. video, offset, sync and blank are coordinated. By scaling these amplitudes automatically, digital data is used only to load the full scale relationships into the video amplitude digital to analog converter which scales the entire arrangement proportionately. Further, the implementation described allows for positive or negative video signal amplitudes via selected switch positions. Still further, with such an implementation, high frequency circuits are minimized and hardware summing techniques isolate high frequency and low frequency channels to preserve maximum band width using the least amount of hardware.

DETAILED DESCRIPTION OF THE INVENTION

Figure 1:
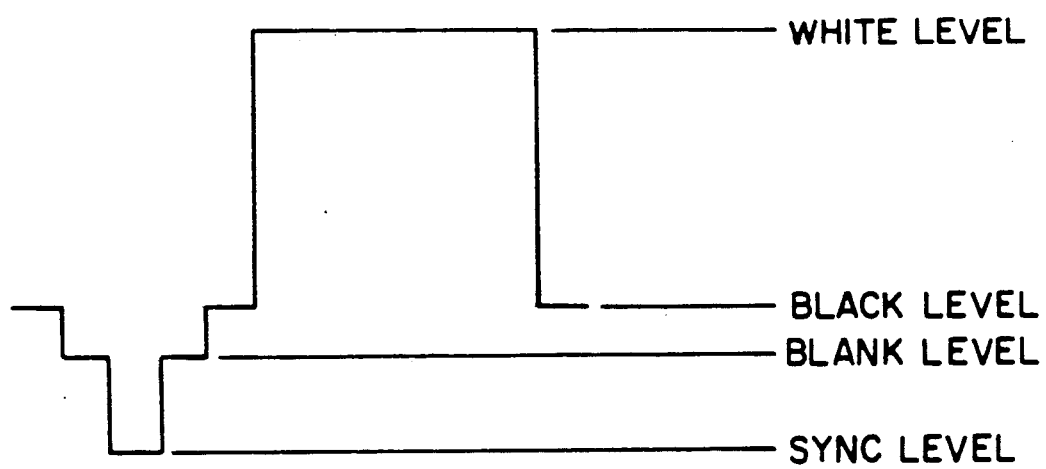
FIG. 1 is a diagrammatic representation indicating the various levels of a composite video signal.

With reference to FIG. 1, it will be understood that multi-level analog composite video signals have several levels. As indicated in the Figure, these levels include a white level which represents a maximum video amplitude; a black level which represents a minimum video amplitude; a blank level and a sync level.

It has been found that for different composite video signals, both of the standard and non-standard variety, there is a substantially consistent ratio between the white level, the sync level and the black level, irrespective of the differences between the required white levels. That is to say, the sync level is approximately forty percent of the white level and the black level is approximately ten percent of the white level. Based on these relationships, a ratiometric or proportional video signal generation can be implemented which allows the control of, for example, a video amplitude digital to analog converter (DAC) to control full scale outputs of other digital to analog converters (DACs). Each individual DAC output can be controlled and fine tuned to meet particular specifications. The present invention is directed to this end.

Figure 2:
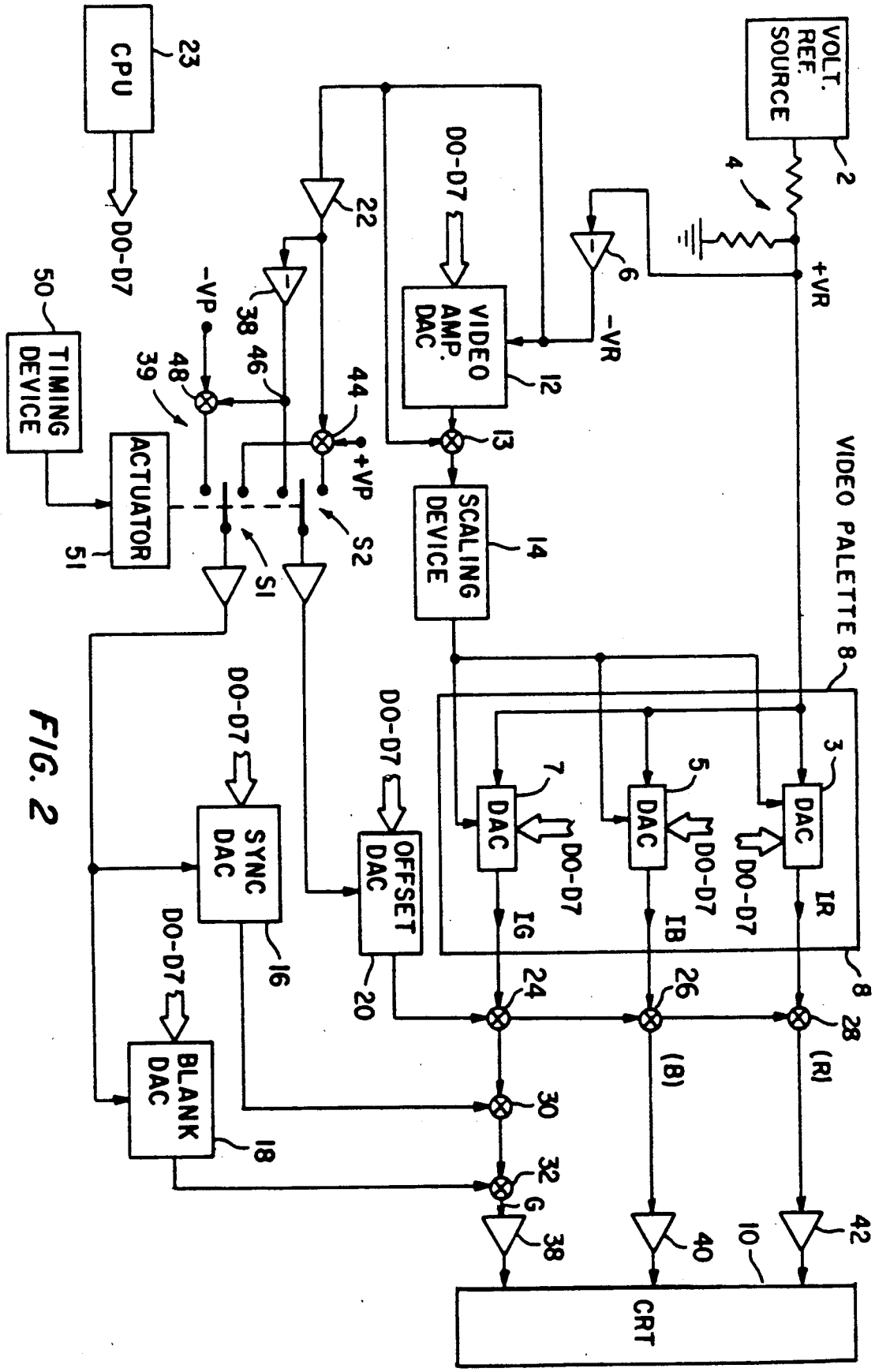
FIG. 2 is a block diagram illustrating multi-level analog composite video signal generating apparatus in accordance with the invention.

With reference to FIG. 2, a stable voltage reference source 2 is used to calibrate the video signal generation implementation. The output of voltage reference source 2 is applied through a resistor arrangement 4 to provide a positive reference voltage +VR. Voltage +VR is applied through an inverting amplifier 6 to provide a negative reference voltage −VR. Voltage +VR is the reference voltage for three DACs 3, 5 and 7 included in a video palette 8. DACs 3, 5 and 7 are used to provide composite red (R), composite blue (B) and composite green (G) analog video signals, respectively, which are applied to a cathode ray tube (CRT) 10 for providing a color raster display.

Voltage −VR is applied to a video amplitude multiplying DAC 12 and is applied to a summing point 13 and is summed thereat with the voltage output of DAC 12, which corresponds to the maximum or white level of the analog composite video signals. The summed voltage output is applied through a scaling device 14 to DACs 3, 5 and 7 in video palette 8 to provide a full scale reference control to the video palette DACs.

Voltage −VR is applied to a difference amplifier 22 and therefrom to an inverting amplifier 38 and through a switching arrangement 39 for providing a reference voltage for a sync DAC 16, a blank DAC 18 and an offset DAC 20, all of which are multiplying DACs. Thus, DACs 16, 18 and 20 have reference voltages derived and scaled from a common point, i.e. the output of difference amplifier 22. Sync DAC 16 provides a current output corresponding to the sync level of the analog composite video signals; blank DAC 18 provides a current output corresponding to the blank level of the analog composite video signals; and offset DAC 20 provides a current output corresponding to the offset of the analog composite video signals from zero level or ground.

In regard to video palette 8, it will be understood that a video palette for high performance, high resolution color graphics is best used. In this connection, a device of the type suitable for the invention is marketed by Brooktree Corporation under their trade designation Bt 451/458 as described in their Product Databook published in 1988.

Specified digital video signal parameters are loaded into video palette 8 via a central processing unit (CPU) 23 which provides a digital data output having bits D0–D7. Digital data output bits D0–D7 are applied to DACs 3, 5 and 7 in video palette 8, to video amplitude DAC 12, to sync DAC 16, to blank DAC 18, and to offset DAC 20. The parameters for the DACs are loaded based on the scaling relationship effected by scaling device 14. It will now be discerned that by controlling the parameter associated with video amplitude DAC 12, the full scale output of each DAC is proportionately controlled. The current outputs of the DACs are summed to provide analog composite signals (R), (B) and (G).

With continued reference to FIG. 2, the current outputs of DACs 16, 18 and 20 are summed with the outputs of DACs 3, 5 and 7 in video palette 8. Thus, offset DAC 20 is connected to a summing point 24, to a summing point 26 and to a summing point 28, whereby the offset DAC current output is summed with the current outputs of DAC 3 (IR), DAC 5 (IB) and DAC 7 (IG). The current output of sync DAC 16 is applied to a summing point 30, where it is summed with the output from summing point 24 and the current output of blank DAC 18 is applied to a summing point 32, where it is summed with the output of summing point 30. Signal (R) is provided at summing point 28, signal (B) is provided at summing point 26 and signal (G) is provided at summing point 32. In this regard, it will be understood that the signals at summing point 26 (B) and at summing point 28 (R) include only offset current. The signal at summing point 32 (G) includes offset, sync and blank current.

The analog composite signals at summing points 32, 26 and 28 are applied to amplifiers 38, 40 and 42 respectively, and are applied therefrom to cathode ray tube (CRT) 10 for providing a color raster display, as is desired.

It will be recognized that the arrangement shown in FIG. 2 permits positive or negative analog video signals via the selection of the positions of switches S1 and S2 in switching arrangement 39.

Thus, a positive voltage +VP is summed with the output of amplifier 22 at a summing point 44. The output of amplifier 38 at a point 46 is summed with a negative voltage −VP at a summing point 48. One leg of switch S1 is connected to summing point 44 and the other leg of said switch is connected to point 46. One leg of switch S2 is connected to summing point 44 and the other leg is connected to summing point 48. The arms of switches S1 and S2 are actuated by a timing device 50 via a solid state actuator 51 or the like for being selectively displaced at predetermined times to one or the other of the respective switch legs. Thus, timing device 50 selects the positions of switch legs S1 and S2 and allows for either positive or negative polarity of the composite video signals, as the case may be.

It will now be recognized that the arrangement in accordance with FIG. 2 simplifies an implementation for generating multi-level composite analog video signals. The implementation described coordinates offset, video, sync and blank amplitudes by scaling these amplitudes automatically. CPU 23 only needs to load the full scale relationships into video palette 8 and the several DACs. DAC 12 will scale the entire arrangement proportionately.

With the arrangement described, the use of high frequency circuits is minimized; and the summing configurations described isolate high frequency and low frequency channels to preserve maximum bandwidth while using the minimum amount of hardware, as will be recognized as desirable.

With the aforenoted description of the invention in mind, reference is made to the claims appended hereto for a definition of the scope of the invention.

What is claimed is:

1. Apparatus for generating red, blue and green analog composite video signals having a white, a black, a blank and a sync level, comprising:
   means for providing a digital output corresponding to video signal parameters;
   means for providing a reference voltage;
   first digital to analog converter (DAC) means connected to the digital output means and the reference voltage means and responsive to the digital output and the reference voltage for providing an output corresponding to the white level of the analog composite video signals;
   scaling means connected to the first DAC means for scaling the output therefrom and for providing a scaled output;
   means connected to the digital output means, to the scaling means and to the reference voltage means and responsive to the digital output, the scaled output and the reference voltage for providing a first output which is a component of the red analog composite video signal, a second output which is a component of the blue analog composite video signal and a third output which is a component of the green analog composite video signal;
   second DAC means connected to the digital output means and the reference voltage means and responsive to the digital output and the reference voltage for providing an output corresponding to the sync level of the analog composite video signals;

third DAC means connected to the digital output means and the reference voltage means and responsive to the digital output and the reference voltage for providing an output corresponding to the blank level of the analog composite video signals;

fourth DAC means connected to the digital output means and the reference voltage means and responsive to the digital output and the reference voltage for providing an output corresponding to the offset of the analog composite video signals from a predetermined level;

first summing means connected to the means for providing the first, second and third outputs and connected to the fourth DAC means for summing the first output and the offset level output and for providing the red analog composite video signal;

second summing means connected to the means for providing the first, second and third outputs and connected to the fourth DAC means for summing the second output and the offset level output and for providing the blue analog composite video signal;

third summing means connected to the means for providing the first, second and third outputs and connected to the fourth DAC means for summing the third output and the offset output and for providing a first summed output;

fourth summing means connected to the third summing means and connected to the second DAC means for summing the first summed output and the sync level output for providing a second summed output; and fifth summing means connected to the fourth summing means and connected to the third DAC means for summing the second summed output and the blank level output for providing a third summed output which is the green analog composite video signal.

2. Apparatus as described by claim 1, wherein the means for providing a reference voltage includes:
a voltage source;
means connected to the voltage source and responsive to the voltage therefrom for providing a reference voltage in one sense; and
means connected to the means for providing a reference voltage in the one sense for providing a reference voltage of the opposite sense.

3. Apparatus as described by claim 2, wherein:
the first DAC means is connected to the means for providing a reference voltage in the opposite sense;
the means for providing the first, second and third outputs is connected to the means for providing a reference voltage in the one sense; and
the second, third and fourth DAC means are connected to the means for providing a reference voltage in the opposite sense.

4. Apparatus as described by claim 3, including:
sixth summing means connected to the first DAC means and to the means for providing a reference voltage in the opposite sense for summing the output of the first DAC means and the reference voltage in the opposite sense; and
the scaling means connected to the sixth summing means for providing the scaled output.

5. Apparatus as described by claim 3, wherein the means for providing the first, second and third outputs is a video palette including:
three DAC means, each of which means is connected to the means for providing a reference voltage in the one sense, to the digital output means and to the scaling means; and
a first of the three DAC means providing the first output, a second of the three DAC means providing the second output and a third of the three DAC means providing the third output.

6. Apparatus as described by claim 2, including:
switching means connected to the means for providing a reference voltage in the opposite sense and connected to the second, third and fourth DAC means; and
said switching means being operable for selectively rendering the second, third and fourth DAC means responsive to the reference voltage in one sense and in an opposite sense, whereby the analog composite video signals are in the one sense and in the opposite sense.

7. Apparatus for generating red, blue and green analog composite video signals having a white, a black, a blank and a sync level, comprising:
means for providing a digital output corresponding to video signal parameters;
means for providing a reference voltage;
first digital to analog converter (DAC) means connected to the digital output means and the reference voltage means and responsive to the digital output and the reference voltage for providing an output corresponding to the white level of the analog composite video signals;
scaling means connected to the first DAC means for scaling the output therefrom and for providing a scaled output;
means connected to the digital output means, to the scaling means and to the reference voltage means and responsive to the digital output, the scaled output and the reference voltage for providing first, second and third outputs;
second DAC means connected to the digital output means and the reference voltage means and responsive to the digital output and the reference voltage for providing outputs corresponding to the sync, blank and offset levels of the analog composite video signal;
means connected to the means for providing the first, second and third outputs and to the second DAC means for summing the first output and the offset level output to provide the red analog composite video signal;
means connected to the means for providing the first, second and third outputs and to the second DAC means for summing the second output and the offset level output to provide the blue analog composite video signal;
means connected to the means for providing the first, second and third outputs and to the second DAC means for summing the third output and the offset level output to provide a first summed output;
means connected to the first summed output means and to the second DAC means for summing the first summed output and the sync level output to provide a second summed output; and
means connected to the second summed output means and to the second DAC means for summing the second summed output and the blank level output to provide the green analog composite video signal.

8. Apparatus as described by claim 7, wherein the means for providing a reference voltage includes:
a voltage source;
means connected to the voltage source and responsive to the voltage therefrom for providing a reference voltage in one sense; and
means connected to the means for providing a reference voltage in the one sense for providing a reference voltage of the opposite sense.

9. Apparatus as described by claim 8 wherein:
the first DAC means is connected to the means for providing a reference voltage in the opposite sense;
the means for providing the first, second and third outputs is connected to the means for providing a reference voltage in the one sense; and
the second, DAC means is connected to the means for providing a reference voltage in the opposite sense.

10. Apparatus as described by claim 9, including:
summing means connected to the first DAC means and to the means for providing a reference voltage in the opposite sense for summing the output of the first DAC means and the reference voltage in the opposite sense; and
the scaling means connected to said summing means for providing the scaled output.

11. Apparatus as described by claim 9, wherein the means for providing the first, second and third outputs is a video palette including:

three DAC means, each of which means is connected to the means for providing a reference voltage in the one sense, to the digital output means and to the scaling means; and
a first of the three DAC means providing the first output, a second of the three DAC means providing the second output and a third of the three DAC means providing the third output.

12. Apparatus as described by claim 8, including:
switching means connected to the means for providing a reference voltage in the opposite sense and connected to the second, DAC means; and
said switching means being operable for selectively rendering the second, DAC means responsive to the reference voltage in one sense and in an opposite sense, whereby the analog composite video signals are in the one sense and in the opposite sense.

13. Apparatus as described by claim 7, wherein the second DAC means includes:
a first DAC connected to the digital output means and the reference voltage means and responsive to the digital output and the reference voltage for providing the sync level output;
a second DAC connected to the digital output means and the reference voltage means and responsive to the digital output and the reference voltage for providing the blank level output; and
a third DAC connected to the digital output means and the reference voltage means and responsive to the digital output and the reference voltage for providing the offset level output.

* * * * *